United States Patent [19]

Lindsay

[11] 4,195,955
[45] Apr. 1, 1980

[54] HOLDER FOR PIN-TYPE REPLACEABLE CUTTING INSERTS

[76] Inventor: Harold W. Lindsay, 2480 NW. Vaughn, Portland, Oreg. 97210

[21] Appl. No.: 4,909

[22] Filed: Jan. 19, 1976

[51] Int. Cl.$^2$ ............................................. B26D 1/12
[52] U.S. Cl. ...................................... 407/40; 407/46; 407/48; 407/101; 407/104
[58] Field of Search ..................... 407/40, 46, 48, 101, 407/104

[56] References Cited

U.S. PATENT DOCUMENTS

| | | | |
|---|---|---|---|
| 3,405,433 | 10/1968 | Williams | 407/40 |
| 3,914,840 | 10/1975 | Ferree | 407/104 |
| 3,946,475 | 3/1976 | Hopkins | 407/48 |
| 4,078,868 | 3/1978 | Evkfritz | 407/48 |

Primary Examiner—Harrison L. Hinson
Attorney, Agent, or Firm—Klarquist, Sparkman, Campbell, Leigh, Hall & Whinston

[57] ABSTRACT

A holder or nest for pin-type replaceable cutting inserts having a circular aperture centrally disposed therein, includes a pin extending perpendicularly to the face of the holder, the pin being cylindrical and being formed with a pair of discrete opposed axially-extending portions, each of the portions comprising a segment of a circular cylinder having a periphery less than 180°. The radius of each of the portions is selected equal to the radius of the aperture in the cutting inserts. The portions meet in a plane normal to the face of the tool holder and disposed perpendicularly to the axis of the clamping screw which is threadedly receivable in the body of the holder. By this means the clamping force exerted by the screws, forces the insert to seat itself on the lateral surface of the one axially extending portion of the pin which is inwardly disposed in the cutter body, thereby to achieve positive seating of the insert on the pin in a direction perpendicular to the pin and parallel to the plane between the axially extending portions thereof.

3 Claims, 7 Drawing Figures

HOLDER FOR PIN-TYPE REPLACEABLE CUTTING INSERTS

BACKGROUND OF THE INVENTION

This invention relates to holders or nests for replaceable disposable cutting inserts used in cutting tools and, more particularly, to such inserts of the pin type having circular apertures centrally disposed therein.

A cutter for such pin-type replaceable cutting inserts is disclosed in my U.S. Pat. No. 3,788,625. That cutter includes recesses extending inwardly of the periphery thereof in which the replaceable disposable inserts are received. A holder or nest is positioned in each recess adjacent the back face of the insert, the insert being retained on an integral pin on the front face of the holder and by a lip formed by a chip clearance cutout at the front of the recess. A keying lug on the back face of the holder is received in a keyway in the recess and includes a screw threadedly receivable in the cutter body. The screw serves to clamp the holder and the insert in the recess with the cutting face of the insert being engaged by the lip.

The inserts used in the above-described cutter are typically formed with a central aperture of 0.312 inch diameter. The pin extending from the holder face was typically formed of a lesser diameter, for example, of 0.302 inch diameter to provide the necessary clearance. The difference in diameter thus necessarily resulted in motion between the pin and the insert after the screw clamps the holder and the insert into the cutter body recess, the motion occurring in a plane perpendicular to the axis of the screw. It has thus been necessary to provide a locating pin for each cutting insert to achieve precise insert location with respect to the work-facing surface of the cutter.

It is thus the primary object of the present invention to provide an insert holder or nest for pin-type replaceable cutting inserts that will achieve precise face run-off, i.e., one that will result in the height of the cutting corner of each insert with respect to the work-facing surface of the cutter being identical.

It is a further object of the present invention to provide an insert holder or nest for pin-type replaceable cutting inserts that will achieve positive seating of the insert on the integral pin of the holder in a direction perpendicular to the pin and parallel to a plane normal to the force of the clamping screw.

It is still a further object of the present invention to provide a holder or nest for pin-type replaceable cutting inserts that will achieve precise face run-off without the necessity of providing a locating pin for the insert.

It is a still further object of the present invention to provide a holder or nest for pin-type replaceable cutting inserts which will achieve positive seating of the insert on the pin, yet will provide adequate clearance for the pin to be received in the insert aperture.

SUMMARY OF THE INVENTION

My insert holder or nest is provided with the usual face for supporting a pin-type replaceable cutting insert having a circular aperture centrally disposed therein. An integral pin extends perpendicularly to the face for retaining the insert in a support relationship adjacent the face. The pin is generally cylindrical, but is formed of a pair of discrete opposed axially-extending portions, each of the portions comprising a segment of a circular cylinder having a periphery less than 180°. The radius of each of the portions is selected equal to the radius of the aperture in the cutting insert. The portions meet in a plane normal to the face of the holder and the cylindrical segments are oriented so that the above-mentioned plane is disposed perpendicularly to the axis of the screw means typically provided for clamping the holder and insert into the cutter body.

By this means the clamping force exerted by the screw means forces the insert to seat on the lateral surface of the one axially extending portion of the pin inwardly disposed in the cutter body, thereby to achieve positive seating of the insert on the pin in a direction perpendicular to the pin and parallel to the plane between the axially extending portions thereof.

Preferably, the axially extending portions are equally sized, whereby the axis of the pin lies in the plane therebetween.

DESCRIPTION OF THE PREFERRED EMBODIMENT

Figure 1:
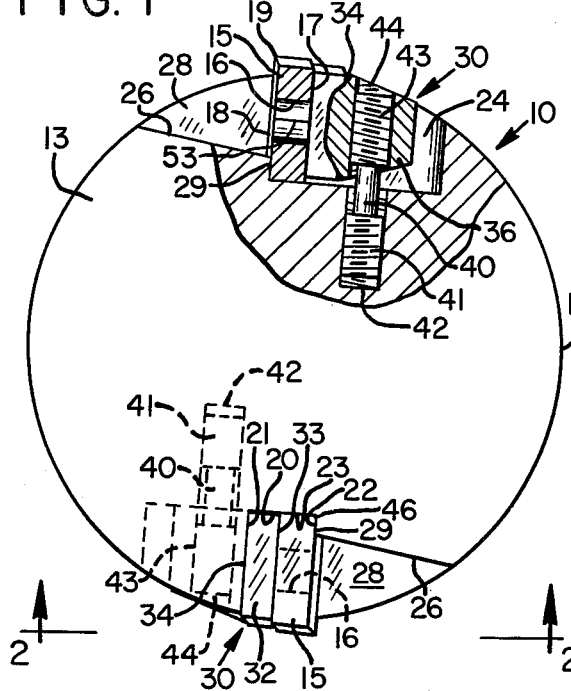
FIG. 1 is a top view of a rotary cutter constructed in accordance with the present invention.
Figure 2:
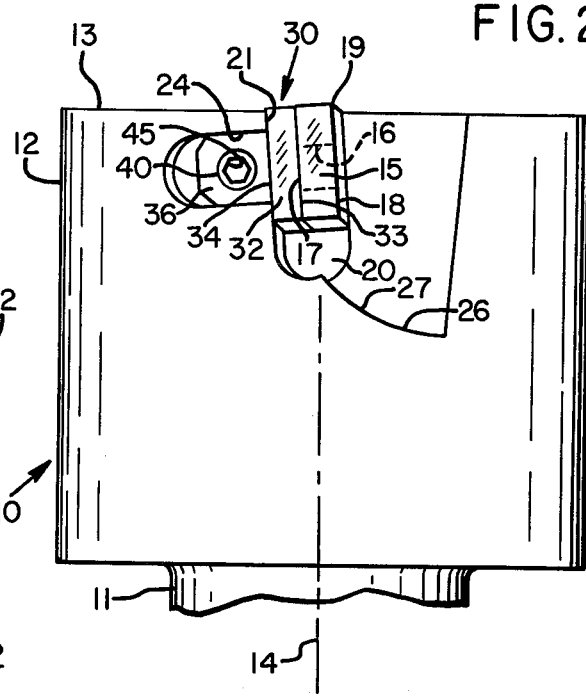
FIG. 2 is a side view of the cutter taken on line 2—2 of FIG. 1.

Referring to the drawings and particularly to FIGS. 1 and 2, a cutting tool forming one embodiment of the present invention is illustrated in the form of a rotary or milling cutter 10 having a shank 11 terminating in a cylindrical head 12 whose work-facing surface 13 is disposed generally perpendicularly to the longitudinal axis 14 of the tool. The cutter 10 is illustrated as being rotatable about its longitudinal axis 14, although it will be understood that cutting tools according to the present invention may not always be rotatable.

The cutter 10 herein illustrated is designed to accommodate, for example, two conventional replaceable carbide or ceramic inserts 15 of the pin-type. Each such insert 15 has a central aperture or bore 16, a back side or back face 17 and a front side or cutting face 18 comprising a cutting edge 19.

The cutter head 12 is dished as shown and is provided with two peripheral, generally radially extending recesses 20, each having a generally radially extending back wall 21, a front wall 22 parallel to the back wall 21 and a generally axially extending bottom wall 23. A keying portion or keyway 24 extends inwardly or rearwardly from the back wall 21 of the recess 20.

A generally chordal cutout 26 is formed in the head 12 extending forwardly of the front wall 22 of the recess 20, (i.e., in a direction opposed to the keyway 24), the cutout 26 being formed with a circular cut 27 to form a bottom 28 merging with the back wall 21 of the recess. The construction provides a radially extending lip 29 on the front wall 22 of the recess, the lip 29 serving to retain the insert 15 in the manner disclosed in my aforementioned U.S. Pat. No. 3,788,625.

Figure 3:
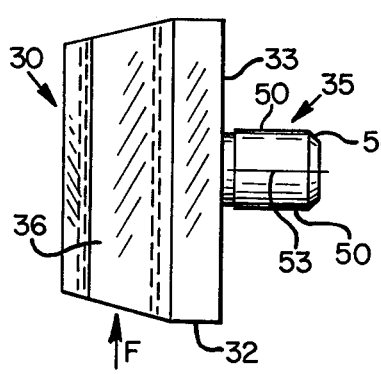
FIG. 3 is a side elevational view of my improved insert holder or nest.
Figure 4:
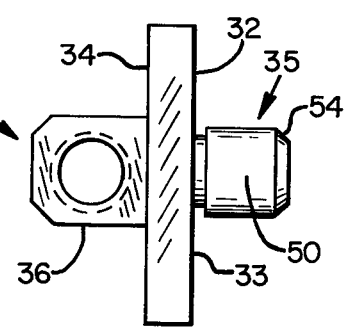
FIG. 4 is a plan view of the holder.
Figure 5:
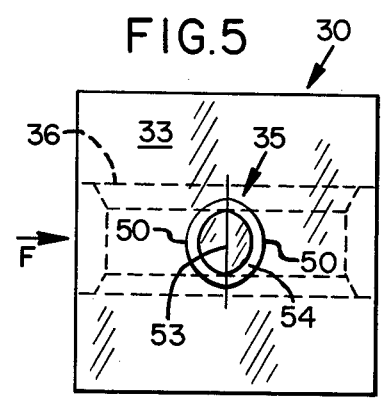
FIG. 5 is a view of the supporting face of the holder.

A holder or nest 30 is removably disposed within each of the recesses 20. As illustrated in FIGS. 3, 4 and 5, each such holder 30 comprises a generally rectangular block 32 having a front side or face 33 and a back side or face 34 parallel thereto. A centrally disposed integral pin 35 extends forwardly or generally circumferentially of the front face 33 for engagement with the aperture 16 of the insert 15 and a symmetrical keying lug 36 extends rearwardly of the back face 34 for engagement with the keyway 24.

The lug 36 is provided with a generally radially-extending screw 40 having a right-hand thread 41 at its inner extremity 42 and a left-hand thread 43 at its outer extremity 44. The inner extremity 42 is threadedly received within the head 12, while the outer extremity 44 is threadedly received within the keying lug 36. The screw 40 is also provided with an internal wrenching socket 45 in its outer extremity 44, whereby rotation of the screw in the clockwise direction simultaneously engages the thread 41 into the head 12 and draws or clamps the holder 30 radially into the recess 20.

As can be seen from the drawings, the insert 15 is received on the pin 35 of the holder 30, the back side or face 17 of the insert engaging the front side or face 33 of the holder and the back side or face 34 of the holder abutting the back wall 21 of the recess 20.

The chordal width of the recess 20 is formed equal to the thicknesses of the insert 15 and the block 32 of the holder 30 so as to form the equivalent of a pocket 46 therefor. Tightening the screw 40 thus forces the holder 30 radially inwardly of the cutter head 12, drawing the insert 15 received on the pin 35 together with the holder 30 into the pocket. The insert 15 and block 32 of the holder 30 bottom together in the recess 20, the insert 15 being held radially by the pin 35, and the front side or cutting face 18 engaging and being retained by the lip 29. The lip 29 prevents circumferential tipping of the insert 15 while the block 32 provides circumferential support. Axially, the insert 15 is maintained in position by the pin 35, the holder 30 itself being held axially in position by the axially symmetrical lug 36 in the keyway 24.

Figure 6:
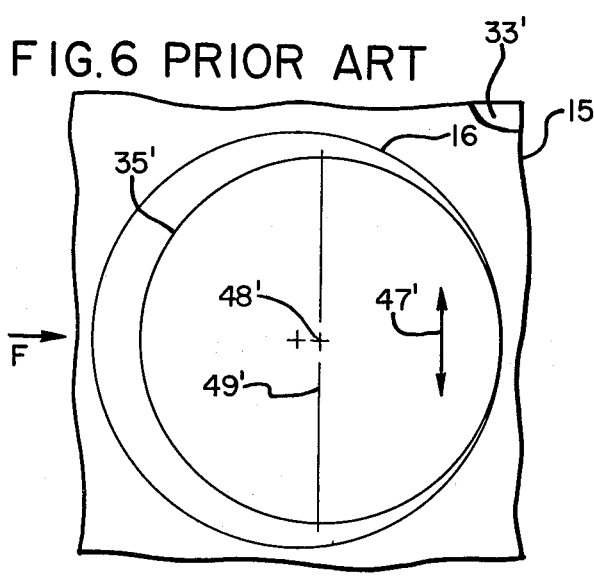
FIG. 6 is a diagramatic view of the relationship between the prior art pin and the insert aperture, wherein the difference in diameters is greatly exaggerated to illustrate the motion that can occur between the pin and the insert in the direction perpendicular to the clamping force.

The problem inherent in the prior art holder is diagramatically illustrated in FIG. 6. As previously mentioned, the insert 15 is typically formed with a central aperture 16 0.312 inch in diameter. In order to achieve adequate clearance for assembly, the prior art pin 35′ was typically formed 0.302 inch in diameter. Tightening the screw 40 exerted a force F on the pin 35′ in the direction of the screw axis. This resulted in the pin 35′ being forced against the radially inward side of the aperture 16, as shown. Because of the difference in the diameters of the pin 35′ and aperture 16, positive seating of the insert 15 on the pin 35′ was not achieved. Motion was possible between the pin 35′ and the insert 15 in the direction of the arrows 47, i.e., in a direction perpendicular to the axis 48′ of the pin 35′ and parallel to the plane 49′ normal to the face 33′ and perependicular to the force F. The height of the cutting edge 19 of each insert 15 over the work-facing surface 13 was thus not identical and it has been necessary to provide a locating pin in order to achieve the necessary precise axial or face run-off.

As shown in FIGS. 3, 4, 5 and 7, the pin 35 of the present invention, although cylindrical and extending prependicularly to the face 33 of the holder 30, is not made in the form of a circular cylinder as in the prior holder, but on the contrary, is formed of a pair of discrete opposed axially-extending portions 50, each of which constitutes a segment 51 of a circular cylinder having a periphery less than 180°. The radius 52 of each of the portions 51 is made equal to the radius 52i of the aperture 16 in the cutting insert 15. This is shown diagramatically to an exaggerated scale in FIG. 7.

The portions 51 are themselves oriented so that they meet in an imaginary plane 53 normal to the face 33 of the holder 30 and disposed perpendicularly to the axis of the screw 40.

Preferably, pin 35 is machined in two passes, each offset a specified amount, typically 0.006 inch, from the theoretical axis 48, whereby the two segments 51 will be identical in size, but opposed in position, and the axis 48 will lie in the plane 53. When so constructed, the maximum dimension of pin 35 taken normal to the axis 48 and in plane 53, will be about 0.301 inch, which is sufficiently smaller than the 0.312 inch diameter of aperture 16 to provide the necessary clearance for the aperture to receive the pin during assembly. This is shown diagramatically in FIG. 7 wherein the aperture 16 is shown in dotted lines. The pin 35 may be chamfered at its end as at 54.

Figure 7:
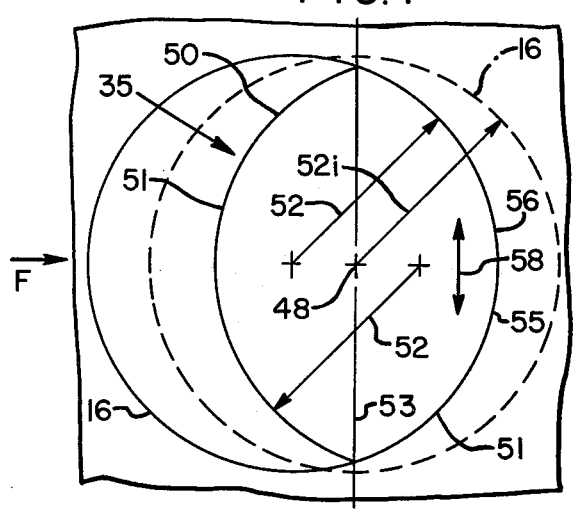
FIG. 7 is a diagramatic view illustrating the relationship between the pin of the present invention and the insert aperture, showing in dotted lines the location of the aperture as the improved pin is received therein and in solid lines, the location of the aperture when the insert is seated on the lateral surface of one of the axially-extending portions of the pin under the clamping force exerted by the screw means, and further illustrating the absence of possible motion in a direction perpendicular to the pin and parallel to the plane between the axially-extending portions thereof.

When the screw 40 is tightened to force the holder 30 radially inwardly of the cutter head 12, the force F acts on the pin 35 in the direction shown in FIG. 7. This causes the insert 15 to be seated on the lateral surface 55 of the axially extending cylindrical segment 56 positioned radially inwardly of the cutter head 12. Since the radius 52 of the segment 56 is indentical to radius 52i of the aperture 16, I achieve a positive seating of the insert 15 on the pin 35, as shown in FIG. 7, wherein the aperture 16 is shown in solid lines. The absolute concurrence of the lateral surface 55 of the segment 56 with the radially inwardly directed side of the aperture 16, permits no motion to occur in the direction of the arrows 58, i.e., in a direction perpendicular to the axis 48 of the pin 35 and parallel to plane 53, which is itself oriented perpendicularly to the axis of the screw 40.

The novel shape of my improved pin 35 results in extremely accurate insert location as respects the work-facing surface 13 of the cutter head 12, notwithstanding the fact that the maximum lateral dimension of pin 35 is actually of lesser diameter than the aperture 16. This results in greatly improved axial or face run-off for the cutter head 12 in that the height of the cutting edge 19 of each insert 15 over the work-facing surface 13 is identical. The construction eliminates the necessity for the locating pin which has heretofore been required.

While a preferred embodiment of my invention has been illustrated and described herein, it is to be understood that such is merely by way of example and that the invention is broadly inclusive of any and all modifications falling within the scope of the following claims:

I claim:

1. A connection between a first body having a pin extending normal to a face thereof and a second body having an aperture for receiving the pin, the connection being adapted to transmit a force between the first and second bodies normal to the axis of the pin, comprising:
   a first body having a face against which a second body is adapted to rest;
   a second body having a circular aperture therein, the circular aperture having a radius of a given dimension; and
   a pin extending normal to the face of the first body, the pin being cylindrical and comprising a pair of discrete axially-extending portions, each of the portions comprising a segment of a circular cylinder having a periphery less than 180°, the radius of each of the portions being equal to the radius of the aperture in the second body, the portions meeting in a plane normal to the face of the first body, the plane being disposed perpendicularly to the direction of a force desired to be transmitted between the first and second bodies,
   whereby a force exerted on the first body normal to the axis of the pin and perpendicular to the plane between the axially-extending portions thereof, causes the second body to seat itself on the lateral surface of the one axially extending portion of the pin opposed to the direction of the force, thereby to achieve a positive seating of the second body on the pin in a direction perpendicular to the pin and parallel to the plane between the axially extending portions thereof.

2. In a cutter body having a recess extending inwardly of the periphery thereof for receiving an insert holder, a pin-type replaceable cutting insert having a circular aperture for receiving a cylindrical pin extending from a face of the insert holder to achieve a supporting relationship adjacent said face, the recess providing a supporting surface for at least one side of the insert, and screw means for clamping the insert holder and the insert into the recess,
   the improvement comprising:
   an insert holder having a face for supporting a pin-type replaceable cutting insert having a circular aperture centrally disposed therein; and
   a pin extending perpendicularly to the face of the insert holder, the pin being cylindrical and comprising a pair of discrete opposed axially-extending portions, each of the portions comprising a segment of a circular cylinder having a periphery less than a 180°, the radius of each of the portions being equal to the radius of the aperture in the cutting insert, the portions meeting in a plane normal to the face of the insert holder, the plane being disposed perpendicularly to the axis of the screw means,
   whereby the clamping force exerted by the screw means forces the insert to seat itself on the lateral surface of the one axially extending portion of the pin inwardly disposed in the recess, thereby to achieve positive seating of the insert on the pin in a direction perpendicular to the pin and parallel to the plane between the axially extending portions thereof.

3. A cutter body as in claim 2, in which the axis of said pin lies in said plane.

* * * * *

UNITED STATES PATENT AND TRADEMARK OFFICE
CERTIFICATE OF CORRECTION

PATENT NO. : 4,195,955
DATED : April 1, 1980
INVENTOR(S) : Harold W. Lindsay

It is certified that error appears in the above-identified patent and that said Letters Patent are hereby corrected as shown below:

The filing date of the application "Jan. 19, 1976" should be --Jan. 19, 1979--.

Column 1, line 64, "support" should be --supporting--;

Column 4, line 2, "perependicular" should be --perpendicular--; line 10, "prependicularly" should be --perpendicularly--; line 43, "indentical" should be --identical--.

Signed and Sealed this

Tenth Day of June 1980

[SEAL]

Attest:

SIDNEY A. DIAMOND

Attesting Officer

Commissioner of Patents and Trademark